A. Boyden,
Tool Handle.
Nº 55,000.    Patented May 22, 1866.
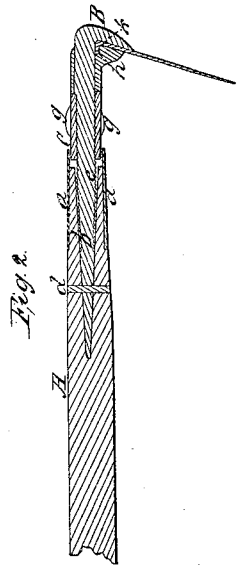
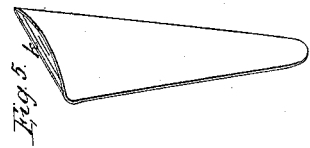
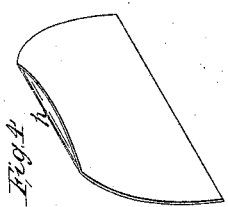
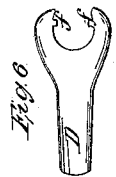
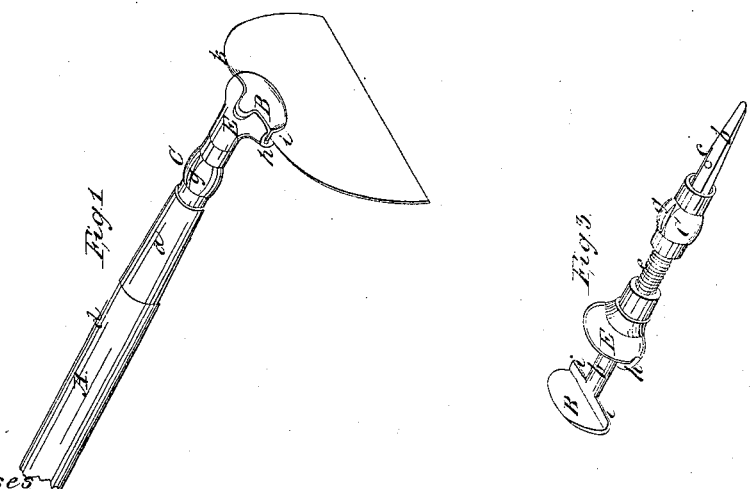
Witnesses
John L. Lynch
Geo. W. Real
Inventor:
Alexander Boyden

UNITED STATES PATENT OFFICE.

ALEXANDER BOYDEN, OF FOXBOROUGH, MASSACHUSETTS, ASSIGNOR TO ALFRED FALES AND ERASTUS P. CARPENTER, OF SAME PLACE.

IMPROVED DEVICE FOR ATTACHING HANDLES TO HOES, RAKES, &c.

Specification forming part of Letters Patent No. 55,000, dated May 22, 1866.

*To all whom it may concern:*

Be it known that I, ALEXANDER BOYDEN, of Foxborough, in the county of Norfolk and State of Massachusetts, have invented a new and Improved Device for Attaching Hoes, Rakes, and other Implements to their Handles, of which the following is a full, clear, and exact description, reference being had to the accompanying drawings, making part of this specification, in which—

Figure 1 is a perspective view of a hoe attached to its handle by means of my improved device. Fig. 2 is a central longitudinal section through the same. Fig. 3 is a perspective view of the under side of the clamp or holder by which the blade or other tool is secured to its handle. Fig. 4 is a perspective view of the blade of the hoe detached. Fig. 5 is a perspective view of the blade of a hoe for digging potatoes. Fig. 6 is a plan of a wrench, to be referred to.

Various agricultural implements, such as hoes, rakes, &c., as at present constructed are respectively attached permanently to separate and independent handles.

The object of my invention is to provide a simple and effectual means by which such implements may be readily secured to and removed from a common handle; and my invention consists in two jaws, one of which is stationary and the other movable, the stationary jaw being provided with a shank by which it is secured to the handle, while the movable jaw fits loosely on the shank of the stationary jaw, and is made to move longitudinally thereon by operating a screw-nut or equivalent device, the implement to be attached being securely grasped between the jaws when clamped together, which allow of its removal in a convenient and expeditious manner when it is desired to substitute a different implement therefor.

To enable others skilled in the art to understand and use my invention, I will proceed to describe the manner in which I have carried it out.

In the said drawings, A is a wooden handle, over one end of which is fitted the ferrule $a$, the end thus inclosed being bored out to receive a metal shank, $b$, upon one end of which is formed a stationary jaw, B, the opposite end of the shank being tapered, as shown in Figs. 2 and 3, and provided with a hole, $c$, for the reception of a pin, $d$, by which it is fastened to the handle A. A portion of the shank $b$ is provided with a screw-thread, $e$, upon which a screw-nut, C, is made to turn by means of a wrench, D, Fig. 6, furnished with projections $f$, which enter notches $g$, made therein.

E is a movable jaw which fits loosely on the shank $b$ of the stationary jaw B, and is made to slide thereon by operating the screw-nut C. Extending transversely across the movable jaw E is formed a groove or recess, $h$, made to receive a projection, $i$, formed on the inside of the stationary jaw B, by which construction any blade or implement (see Figs. 4 and 5) provided with a suitable lip or projection, $k$, may be securely grasped, when the movable jaw is brought up so as to close it against the stationary jaw and clamp it in a position ready for use, as seen in Figs. 1 and 2.

Instead of the clamp being constructed as shown and described, the inner jaw may be provided with a shank, and the outer jaw made to slide thereon; or the positions of the groove $h$ and projection $i$ may be reversed, and, if preferred, the lip on the implement may be dispensed with, and it may be steadied in place by means of a projection on either jaw fitting into a hole or recess in the blade or other implement. A variety of tools, such as hoes, rakes, &c., of different sizes may in this way be readily secured to a common handle.

What I claim as my invention, and desire to secure by Letters Patent, is—

1. The stationary jaw B, in combination with a movable jaw, E, operated by a screw-nut, C, or equivalent device, for receiving and holding the implement, substantially as described.

2. In combination with the above, a blade or other implement provided with a lip, projection, or recess, substantially as and for the purpose set forth.

ALEXANDER BOYDEN.

Witnesses:
JOHN Q. LYNCH,
GEO. W. BEAL.